United States Patent Office 3,719,606
Patented Mar. 6, 1973

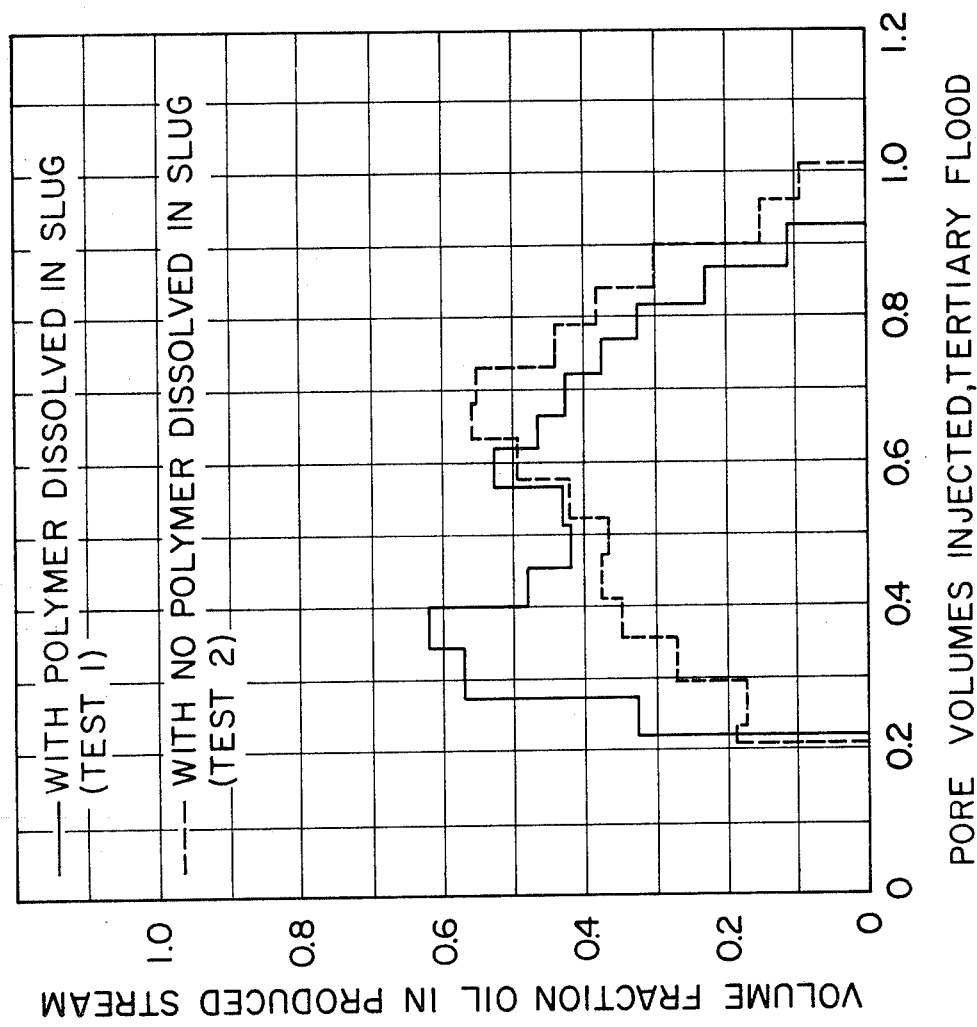

3,719,606
MICROEMULSION OF INCREASED VISCOSITY
FOR IMPROVED OIL RECOVERY
H R. Froning and Warren S. Askew, Tulsa, Okla., assignors to Pan American Petroleum Corporation, Tulsa, Okla.
Filed Aug. 8, 1969, Ser. No. 848,501
Int. Cl. B01j 13/00
U.S. Cl. 252—306
8 Claims

ABSTRACT OF THE DISCLOSURE

In the use of microemulsions as solvents in miscible waterflooding, the displacement efficiency of such solvents is improved by increasing their viscosity with a compatible polymer thickener such as polysaccharide B–1459 or poly(glucosylglucans). Modified microemulsions of this type and their use in miscible flooding are described.

INTRODUCTION

The present invention relates to new and useful compositions of matter, and to methods for their application to assist in recovery of oil from underground deposits thereof. More particularly, it is concerned with microemulsions or solubilized oil-water solutions of increased viscosity, the use of which in secondary or tertiary recovery methods results in a significant improvement in the efficiency of the flooding operation. Such systems remain essentially homogeneous and stable even with high concentrations of water, e.g., 90–95 weight percent and at temperatures of about 200° F.

BACKGROUND OF THE INVENTION

It has previously been pointed out that solubilized oil-water solutions employed in miscible flooding or similar operations should be miscible with the oil-in-place, stable with respect to connate water, and in turn be completely displaced by the driving fluid. Thus, both the composition of the solubilized oil-water solutions and that of the driving fluid are critical. The driving fluid should possess controlled mobility to prevent loss of miscibility characteristics between the solubilized oil-water slug and in-place oil due to viscous fingering and bypassing. Furthermore, the miscible slug itself will be trapped unless the driving fluid can displace the slug without a phase separation occurring in the porous media. Such phase separations do not occur if the driving fluid and microemulsion are completely miscible or if an extremely low interfacial tension, e.g. 0.01 dyne per cm. exists between the fluids. To prevent trapping of the solvent slug in the reservoir pore space a mobility control fluid is usually added in the form of a thickened aqueous solution to provide a buffer between the slug and the driving water thereby preventing bypassing of the water around the solvent thus improving the efficiency with which the solvent is displaced through the reservoir.

However, oil recovery methods of this kind which yield or approach complete oil recovery generally exhibt an adverse mobility ratio between the driving slug and the reservoir fluids and between the solvent slug and the driving water. A process that completely removes the residual oil saturation and leaves the reservoir pore space free of trapped fluids greatly increases the permeability of the reservoir pore space to water. This increase may be of the order of 10 to 50 fold. Under these conditions the driving slug and water tend to finger through or bypass the oil causing displacement and sweep efficiencies to be low. The mobility of an oil external microemulsion slug composed of an oil soluble surfactant, cosurfactant, hydrocarbon oil and water can generally be adjusted by controlling the viscosity of the slug through water addition. The viscosity of these oil-external microemulsions is very sensitive to water content. However, when soluble oil-water solutions or microemulsions containing large concentrations of water are used, small changes in water content have relatively little effect on the viscosity of the slug. Laboratory investigations have demonstrated that these high water content solubilized oil-water solutions are capable of reducing the oil saturation to extremely low values. For field flooding operations, however, a means of controlling the mobility of the slug is desired.

SUMMARY OF THE INVENTION

In addition to the use of a thickened slug between the solvent and the driving water to prevent bypassing of the latter around the solvent we have found that the displacement efficiency of the solvent slug itself can be very substantially improved by dissolving therein a compatible thickening agent to increase the viscosity of the slug, thereby decreasing the tendency of the solvent slug to bypass the oil bank. In its broadest embodiment our invention involves the use of such thickeners to increase the viscosity of the microemulsions or solubilized oil-water systems used in flooding operations of the type referred to above.

The thickening agents we employ for this purpose may be naturally occurring or synthetic polymers. As examples of materials suitable for this purpose there may be mentioned certain of the polysaccharides. A preferred material is further designated as polysaccharide B–1459, prepared by the fermentation of a glucose containing culture medium with a strain of bacterium known as *Xanthomonus campestris* NRRL B–1459. This material is commercially available from the Kelco Company, San Diego, Calif. 92123, under the trademark "Kelzan." Another polymer suitable for this purpose is the poly(glucosylglucan) sold under the trademark "Polytran" by the Pillsbury Company, Minneapolis, Minn. 55402. Further information on the preparation and properties of these materials is to be found in U.S. 3,372,749 and U.S. 3,373,810 and in the Journal of Applied Polymer Science, vol. 5, p. 519 (1961). These particular polysaccharides are dissolved in the solubilized oil-water solution in a concentration sufficient to impart to the solution a viscosity substantially equal to or slightly greater than that of the oil to be displaced. Concentrations of the polysaccharide of from about 0.005 percent to about 1 percent are generally satisfactory. Ordinarily, however, a concentration of from about 0.01 to about 0.3 percent by weight should be used. The molecular weight of these polysaccharides has not been accurately determined but is generally regarded to vary over a rather wide range up to a maximum of several millions. The material we generally prefer to use, however, has a molecular weight such that a 1 percent by weight aqueous solution thereof at 75° F. has a viscosity of from about 500 to not more than about 3,000 cps.

Since these materials are subject to bacterial decomposition after a time, a preservative or bactericide should be added to solutions thereof. Preservatives such as mercuric chloride or alkali metal chlorinated phenols, such as sodium pentachlorophenol, may be used for this purpose. Certain of the common mobility control agents such as partially hydrolyzed polyacrylamides, sugar, etc., however, have been found to be unsuitable for use in increasing the viscosity of these solubilized oil-water solutions since they tend to cause such solutions to become unstable.

The solubilized oil-water systems to which the above mentioned thickeners may be added in accordance with our invention cover a wide range of compositions. Generally speaking, these solutions contemplate three types of compositions:

(1) High water content, e.g. up to about 95 weight percent solutions containing an alkali metal alkyl aryl, petroleum, or aliphatic hydrocarbon polymer sulfonate, and a water soluble alcohol.
(2) Solutions the same as those in Class 1 except the water content does not exceed about 40 weight percent. Oil may be added to these solutions.
(3) Solubilized solutions having an oil soluble surfactant, a hydrocarbon oil, and an ethylene oxide adduct of an alcohol of from 4 to 10 carbon atoms (cosurfactant), with a water content of from 20 to about 95 percent.

In addition to the high water content, low interfacial tension solutions of the type contemplated in Class 1 above, microemulsions of the type described in Gogarty et al. U.S. 3,254,714; U.S. application Ser. No. 848,500, filed Aug. 8, 1969 by W. S. Askew et al.; U.S. application Ser. No. 848,682, filed Aug. 8, 1969 by L. W. Jones et al.; and U.S. application Ser. No. 848,748, filed Aug. 8, 1969, by W. S. Askew et al., may also be used in combination with compatible thickeners in accordance with our invention.

For purposes of this description the term "microemulsion" or "solubilized oil-water solution" is used to denote the solvent slug compositions contemplated herein and refers to systems consisting essentially of an oil-soluble sulfonate, a cosurfactant—as defined herein—a hydrocarbon oil and water, which may vary from fresh water up to about 55,000 p.p.m. in salinity.

In utilizing the compositions of our invention in an oil recovery process a solution of the oil soluble sulfonate, hydrocarbon, and cosurfactant is first prepared. Thereafter, the compatible thickener is dissolved in water or an aqueous brine and the resulting mixture added to the oil solution. The presence of the thickener frequently increases the viscosity of the microemulsions by as much as 10 or 12 fold. The resulting solvent slug of increased viscosity is then introduced into the formation in an amount corresponding to from about 0.02 to about 0.15 pore volume. Preferably and immediately behind the thickened solvent slug is introduced a mobility control fluid (usually thickened water) having a mobility no greater than that of the solvent slug. The quantity of mobility control fluid is employed in volumes ranging from about 0.15 to about 0.65 pore volume. Thereafter the slugs of thickened solvent and mobility control fluid are displaced through the formation forcing oil toward the producing well(s). The displacing or driving fluid may be water or a mixture of water and a gas.

The oil soluble sulfonate employed in the preparation of the novel composition of our invention may be produced by treatment of lube stocks or similar mineral oils, first with sulfuric acid and then neutralizing with caustic or ammonia. Such sulfonates are frequently referred to as petroleum mahogany sulfonates. The presence of excessive amounts of divalent metal ions in the system in which these microemulsions are used is undesirable. Likewise, the petroleum alkali metal sulfonates when in a formation brine containing divalent metal ions tend to create emulsion problems. The synthetic alkyl aryl sulfonates may be considered the equivalents of the petroleum sulfonates mentioned above and are ordinarily used in the form of a hydrocarbon oil solution containing from about 60 to about 85 weight percent of the sulfonate. The average molecular weight of these sulfonates ranges from about 350 to about 600, a preferred range being from about 400 to 525. Other sulfonates suitable for use in preparing these solubilized oil-water solutions are produced by sulfonating a polybutene or polypropene which is in turn prepared by polymerizing butene or propene in the presence of ammonium chloride under known conditions. The polybutene ranges in molecular weight from about 300 to about 400 and the applicable polypropene may vary in molecular weight from about 400 to about 575 as determined by Mechrolab osmometer. These sulfonates are generally used in an oil solution, e.g., unreacted polybutene or polypropene, in which the sulfonate is present in a concentration of about 60 to about 80 weight percent. Accordingly, where the term "sulfonate" is used herein it is to be interpreted as a hydrocarbon solution of the above indicated strengths.

All of these sulfonates are predominantly oil soluble and their solubility in water should not exceed about 5 weight percent. In referring to these materials as "alkali metal," petroleum hydrocarbon or polybutene, etc., sulfonates, it is to be understood that such term includes the ammonium sulfonates as well as the sulfonates of the alkali metals.

As examples of cosurfactants or coupling agents useful in preparing the solutions of our invention there may be mentioned the water soluble alcohols, the oil soluble alcohols of not more than 10 carbon atoms and the 2 to 12 mol ethylene oxide adducts of primary alcohols having from 4 to 10 carbon atoms such as n-butanol, 2-ethyl hexanol, n-hexanol, n-octanol, n-decanol or their equivalents prepared from the corresponding alkylene glycol and alcohol. In general, we prefer to use the 6 to 8 mol ethylene oxide adduct of n-hexanol.

Mobility control agents suitable for use in combination with the thickened solvent slugs of our invention in addition to the polysaccharide B–1459 mentioned above are the partially hydrolyzed polyacrylamides of the kind described in U.S. 3,039,529. Solutions of these materials in concentrations of from about 0.05 to about 5 weight percent are employed between the solvent slug and the drive agent to prevent the latter from bypassing the solvent in the formation.

Some practical field applications of miscible waterflooding in accordance with our invention contemplate operations at temperatures of 200° F. and above as well as reservoir temperatures of the order of 80 to 100° F. The solubilized oil-water solutions of our invention are miscible with oil and exhibit a low interfacial tension, i.e. of the order of 0.01 dyne per cm., with water. For example, we have prepared solubilized oil-water solutions possessing outstanding solvent properties using a 4:1 ratio of sodium petroleum sulfonate to cosurfactant—in this case the 2 mol ethylene oxide adduct of n-hexanol—fresh water and mineral oil. Typically, these solutions can hold from about 20 up to 90 or 95 weight percent water and still retain the characteristics of an oil.

SPECIFIC EMBODIMENTS OF THE INVENTION

Typical solubilized oil-water solutions contemplated by our invention and to which a compatible thickener may be added are illustrated by the following compositions.

Composition I contains 92% 0.3 N sodium chloride brine, 5% alkali metal mahogany sulfonate, and 3% isopropyl alcohol. The viscosity of this solution at room temperature is 3.2 cps.

Composition II contains 90% 0.05 N sodium chloride brine, 8.6% ammonium polybutene sulfonate (65% active and an average molecular weight of about 411), and 1.4% of a 6 mol ethylene oxide adduct of 1-hexanol. The viscosity of this solution at room temperature is 2.0 cps.

Laboratory scale floods have shown that both of the above compositions, without added thickener, are capable of reducing the oil saturation in a core—simulating formation conditions to extremely low values. For field flooding operations, however, a means of controlling the mobility of the solvent slug is needed. To accomplish this, we incorporate in the slug a compatible high molecular weight polymer. In a test with crude oil from the Barrett Field (Nebraska), we found that the addition of a polysaccharide B–1459 to a solubilized oil-water solution corresponding to Composition I above greatly increases the viscosity of said solution while not interfering with maintenance of a very low interfacial tension (about 0.01 dyne per cm.) required to improve oil recovery.

In this connection two tertiary floods of Barrett Field crude oil were performed in a 12" by 2" Berea sandstone core prepared as follows: The core was first flooded with a .05 N brine followed by injection of Barrett crude oil to simulate formation conditions. It was then waterflooded after which a solvent slug corresponding to Composition No. 1 was injected into the prepared core. The flood was conducted by following the injected solvent slug with an aqueous .2 weight percent polysaccharide solution in 15,000 p.p.m. brine which was used to displace the oil and solvent slug through the core at 200° F. In Run No. 2 the same procedure was followed except a polysaccharide B-1459 was added to the solvent slug in an amount sufficient to produce a 0.2 weight percent concentration thereof in the slug. The conditions employed and the results obtained by the tertiary flood are shown in the table below.

TABLE I

| Run No. | Viscosity of slug, cp.[1] | Percent pore vol. of slug | Viscosity polymer water, cp.[1] | Percent pore vol. driving water | Tertiary oil recovery percent oil-in-place |
|---|---|---|---|---|---|
| 1 | 3.2 | 21.9 | 6.2 | 118 | 82.2 |
| 2 | 36.7 | 21.0 | 6.2 | 30 | 89.4 |

[1] Room temperature values measured in falling ball viscosimeter.

A second series of runs was performed, the results of which are shown in the accompanying drawing and in Table II below. In this work two tertiary floods were performed in 22" by 2" Berea sandstone cores at 200° F. with Barrett Field crude oil in place. The slug composition was a 4:1 mixture of an ammonium polybutene (cable oil) sulfonate (active sulfonate basis, molecular weight 498) and a 6 mol ethylene oxide adduct of 1-hexanol cosurfactant. In the first run 1 volume part of the 4:1 mixture was mixed with 9 volume parts of .05 N sodium chloride brine. In run No. 2, 1 part of the 4:1 mixture was mixed with 9 parts of .05 N sodium chloride brine containing .2 weight percent of polysaccharide B-1459. In both runs a 0.3 weight percent polysaccharide B-1459 in .05 N sodium chloride brine was used as the mobility buffer.

TABLE II

| Test No. | Slug viscosity,[1] cps. | Percent pore vol. slug injected | Percent pore vol. polymer injected | Tertiary oil recovery[2] oil-in-place (tertiary) | Percent slug recovery |
|---|---|---|---|---|---|
| 1 | 0.7 | 20.9 | 43.8 | 90.2 | 0.0 |
| 2 | 3.0 | 21.2 | 42.4 | 100 | 56.9 |

[1] Cps. at 200° F. with a falling ball viscosimeter.
[2] All figures are for oil recovery only—no oil in emulsion included.

Reference to the accompanying drawing shows that the oil production after injection of the polymer-containing solvent slug was more rapid and greater in yield than in the case where no polymer was added to the slug. Also, in this connection, it will be seen from the curves in the plot presented that the solvent slug bank containing the thickener (polymer) formed more quickly than the one without the thickener, thus resulting in more rapid recovery of oil which in turn gives a more favorable return on the investment. The data in Table II show that the presence of the thickener in the solvent slug resulted in a more efficient recovery of oil and that a smaller quantity of the solvent slug is actually required to achieve this result than is needed without the polymer dissolved therein. It is also to be noted from the data in Table I that the addition of the solvent slug components to a 0.2 weight percent polymer solution in 0.3 N brine produces a synergistic effect insofar as concerns the viscosity of the system, the final solution having a room temperature viscosity of 36.7 cps. Under the same conditions the viscosity of the driving water containing .2 weight percent polymer in 15,000 p.p.m. brine was 6.2 cps. while that of the slug in .3 N brine—without the polymer—was 3.2 cps.

From the foregoing description it will be appreciated that we have provided a general method of mobility control by the addition of a compatible polymer to a solubilized oil-water solution or a microemulsion to increase the viscosity thereof for more efficient oil recovery in miscible flooding. As a result of this discovery bypassing of the solvent slug around the oil bank is minimized resulting in a faster buildup of the solvent bank, more rapid oil recovery and the use of less solvent than is required by procedures employed in the past.

We claim:
1. A microemulsion consisting essentially of a hydrocarbon solution of an oil soluble alkali metal sulfonate having an average molecular weight ranging from about 400 to about 675, a cosurfactant selected from the group consisting of water soluble monohydric alcohols, oil soluble monohydric alcohols of not more than 10 carbon atoms, and 2 to 12 mol ethylene oxide adduct of a monohydric alcohol having from 4 to 10 carbon atoms, from about .005 to about 1.0 weight percent of a polysaccharide dissolved therein and not more than about 95 weight percent of an aqueous brine containing up to about 55,000 p.p.m. of a salt of a monovalent cation, the molecular weight of said polysaccharide being such that a one weight percent solution thereof in water at 75° F. has a viscosity of about 500 to about 3,000 cps.

2. The microemulsion of claim 1 wherein said polysaccharide is polysaccharide B-1459.

3. The emulsion of claim 1 wherein the oil soluble alkali metal sulfonate has an average molecular weight of from about 400 to about 600.

4. The emulsion of claim 1 wherein the oil soluble alkali metal sulfonate is an aliphatic hydrocarbon polymer sulfonate in which the hydrocarbon portion thereof is derived from a polymer selected from the group consisting of polybutene and polypropene, said polymer ranging in molecular weight from about 300 to about 575.

5. The emulsion of claim 1 wherein the sulfonate empolyed is in the form of the ammonium salt.

6. The emulsion of claim 1 wherein the cosurfactant is isopropyl alcohol.

7. The microemulsion of claim 1 wherein the cosurfactant is selected from the group consisting of a 2–12 mol ethylene oxide adduct of a monohydric alcohol having from 4 to 10 carbon atoms.

8. The emulsion of claim 1 wherein the cosurfactant is the 6 to 8 mol ethylene oxide adduct of 1-hexanol and the oil soluble sulfonate is derived from a polymer selected from the group consisting of polybutene and polypropene, said polymer ranging in molecular weight from about 300 to about 575.

References Cited
UNITED STATES PATENTS

| 1,970,578 | 8/1934 | Schoeller et al. | 252—NID |
| 3,067,038 | 12/1962 | O'Connell | 99—144 |
| 3,500,912 | 3/1970 | Davis, Jr., et al. | 252—309 |

OTHER REFERENCES

Marathon Oil Co., Technical Disclosure Bulletin—Tosch et al., vol. #III, March 1966, p. 5.

JOHN D. WELSH, Primary Examiner

U.S. Cl. X.R.

166—175; 252—310, 308, 311